(12) United States Patent
Chintapalli et al.

(10) Patent No.: US 11,826,695 B2
(45) Date of Patent: Nov. 28, 2023

(54) SYSTEM AND METHOD TO SEPARATE GASES USING HIGH VISCOSITY LIQUID SORBENTS IN A SPRAY CONTACTOR

(71) Applicant: PALO ALTO RESEARCH CENTER INCORPORATED, Palo Alto, CA (US)

(72) Inventors: Mahati Chintapalli, Mountain View, CA (US); Jerome Unidad, San Francisco, CA (US); Kathryn F. Murphy, Redwood City, CA (US); Ravi Neelakantan, San Diego, CA (US); Rahul Pandey, Cupertino, CA (US); Stephen Matthew Meckler, Campbell, CA (US); David Mathew Johnson, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 172 days.

(21) Appl. No.: 17/509,816

(22) Filed: Oct. 25, 2021

(65) Prior Publication Data

US 2023/0130161 A1    Apr. 27, 2023

(51) Int. Cl.
*B01D 53/14* (2006.01)
*B01D 53/18* (2006.01)

(52) U.S. Cl.
CPC ..... *B01D 53/1493* (2013.01); *B01D 53/1425* (2013.01); *B01D 53/1475* (2013.01);
(Continued)

(58) Field of Classification Search
CPC ............ B01D 53/1493; B01D 53/1425; B01D 53/1475; B01D 53/185; B01D 2252/204;
(Continued)

(56) References Cited

U.S. PATENT DOCUMENTS 5,093,094 A    3/1992  Van Kleeck et al.
8,673,227 B2   3/2014  Black et al.
(Continued)

FOREIGN PATENT DOCUMENTS

CN         201578973 U       9/2010

*Primary Examiner* — Stephen Hobson
(74) *Attorney, Agent, or Firm* — Miller Nash LLP (57) ABSTRACT

A gas separation system has system input inlet configured to receive a stream mixture including a target gas, one or more spray generators positioned to spray a non-sprayable liquid to change a concentration of the target gas in the non-sprayable liquid, one or more system outlets positioned to outlet an output material, wherein at least one of the system outlets outputs a material having a lower amount of the target gas than the input stream mixture, and a recirculating path connected to the one or more outputs and the input inlet to allow recirculation of the non-sprayable liquid. A method of performing gas separation includes absorbing a target gas from an input stream in a non-sprayable capture liquid, and releasing the target gas in an output gas stream by spraying the non-sprayable capture liquid into a heated volume using a spray generator. A method of performing gas separation includes receiving an input stream that includes a target gas, using one or more spray generators to apply a non-sprayable liquid as a spray to the input stream to change a concentration of the target gas in the liquid, and outputting the liquid with the changed concentration through an outlet.

13 Claims, 5 Drawing Sheets

(52) U.S. Cl.
CPC ...... *B01D 53/185* (2013.01); *B01D 2252/204* (2013.01); *B01D 2252/20415* (2013.01); *B01D 2252/20478* (2013.01); *B01D 2257/102* (2013.01); *B01D 2257/504* (2013.01); *B01D 2258/0283* (2013.01)

(58) Field of Classification Search
CPC ........... B01D 2252/20415; B01D 2252/20478; B01D 2257/102; B01D 2257/504; B01D 2258/0283; B01D 53/18; Y02C 20/40; B05B 3/02; B05B 17/04
See application file for complete search history.

(56) References Cited

U.S. PATENT DOCUMENTS

| | | |
|---|---|---|
| 9,789,499 B2 | 10/2017 | Beck et al. |
| 2012/0017759 A1 | 1/2012 | Gu et al. |
| 2013/0323147 A1* | 12/2013 | Iijima ............... B01D 53/1425 423/220 |
| 2019/0329278 A1* | 10/2019 | Unidad ................ B05B 7/0075 |

* cited by examiner

SYSTEM AND METHOD TO SEPARATE GASES USING HIGH VISCOSITY LIQUID SORBENTS IN A SPRAY CONTACTOR

TECHNICAL FIELD

This disclosure relates to capturing gases, more particularly to capturing gases using capture solutions and a spray contactor.

BACKGROUND

Over 30% of $CO_2$ emissions in the US comes from the electric power sector, mostly from fossil-fuel burning power plants. Capturing $CO_2$ from large emissions sources and sequestering it can mitigate the release of $CO_2$ into the atmosphere. However, current methods for $CO_2$ capture are costly and energy intensive, limiting their widespread adoption. The most mature technology for $CO_2$ capture use aqueous solutions of organic amines, such as monoethanolamine (MEA), piperazine (PA), etc. to capture and release $CO_2$ using a temperature swing. $CO_2$ is captured at low temperatures in the range of less than 100° C., typically 30-60° C., and released at high temperatures of typically greater than 100° C.

Aqueous amines are energy intensive to cycle because they contain a large volume fraction of water. Water is used to decrease the viscosity of the capture solution to reduce pumping energy. However, because water is not active in $CO_2$ adsorption it leads to high parasitic thermal load in the temperature cycle due to its high heat capacity. The viscosities of amine solutions increase non-linearly with $CO_2$ loading, leading to complexities in solvent pumping and system design. Promising water-lean solvents with high specific $CO_2$ absorption capacities have been identified, but they are not compatible with conventional absorber designs due to high viscosity.

The cost of $CO_2$ capture with amine solutions increases with decreasing $CO_2$ concentration in the flue gas, going from approximately \$50/t-$CO_2$ for flue gas from coal-fired plants of approximately 12% $CO_2$, to approximately \$70/t-$CO_2$ for flue gas from natural gas combined cycle plants of approximately 4% $CO_2$. As coal-fired power plants are phased out, point source capture opportunities will shift to lower $CO_2$ concentrations. Solvents and processes with higher specific capacity, faster uptake kinetics, and lower energy intensity will be required to bring down the cost of $CO_2$ capture.

Current adsorbers, which operate by flowing capture solvent over packing material in a column, are designed to run continuously. Intermittent operation results in loss of priming or dewetting of packing materials. In the future as more intermittent renewable energy sources are brought online, fossil fuel power plants will need to operate more flexibly, with increased ramping capability. $CO_2$ capture processes that are more compatible with flexible operation are desired.

Spray contactors have been considered for improving the operation-flexibility and kinetics of $CO_2$ capture processes; a steam of $CO_2$-containing gas is brought into contact with a sprayed capture solution, wherein the spraying enhances the surface area-to-volume ratio of the capture solution to increase $CO_2$ uptake kinetics and utilization of the solution. Current types of spray contactors used in capture processes, use conventional atomization techniques such as pressurized nozzles with either liquid-only or liquid and gas flow or rotating disk atomizers, use capture solutions that exhibit low viscosity and Newtonian behavior. The low viscosity of these capture solutions, with respect to their surface tension, determines whether the fluids can be atomized using these conventional means via known droplet break-up processes. However, these spray methods have limited applicability for high capacity capture solutions such as ionic liquids, water-lean solvents due to their high viscosity and/or non-Newtonian behavior. The limitations are worsened when these capture solutions are loaded with $CO_2$ as they can increase in viscosity by several fold or exhibit further non-Newtonian behavior that limit atomization such as extensional hardening or shear thickening Other types of reactors can be used for $CO_2$ capture, including bubble reactors, packed column reactors, falling film reactors, and conventional spray towers. In addition, other methods of separation may be used, such as membranes, physisorbing solvents, solid sorbents, electrochemical processes, etc. However, none of these methods have been proven economical to capture emissions at low $CO_2$ concentrations in the gas stream. Conventional spray and other non-encapsulant approaches have limited tolerance to high viscosity and non-Newtonian liquids with viscosity changes during the gas separation process.

SUMMARY

According to aspects illustrated here, there is provided a gas separation system that includes a system input inlet configured to receive a stream mixture including a target gas, one or more spray generators positioned to spray a non-sprayable liquid to change a concentration of the target gas in the non-sprayable liquid, one or more system outlets positioned to outlet an output material, wherein at least one of the system outlets outputs a material having a lower amount of the target gas than the input stream mixture, and a recirculating path connected to the one or more outputs and the input inlet to allow recirculation of the non-sprayable liquid.

According to aspects illustrated here, there is provided a method of performing gas separation that includes receiving an input stream that includes a target gas, and using one or more spray generators to apply a non-sprayable liquid as a spray to the input stream to change a concentration of the target gas in the liquid, and outputting the liquid with the changed concentration through an outlet.

According to aspects illustrated here, there is provided a method A method of performing gas separation that includes absorbing a target gas from an input stream in a non-sprayable capture liquid, and releasing the target gas in an output gas stream by spraying the non-sprayable capture liquid into a heated volume using a spray generator.

BRIEF DESCRIPTION OF THE DRAWINGS

FIG. 5 shows an embodiment of a carbon capture and utilization process system.

DETAILED DESCRIPTION OF THE EMBODIMENTS

The embodiments involve a method and related systems to capture gases such as $CO_2$ using high viscosity or non- Newtonian capture solutions. As used here, the term "non-sprayable" means a liquid that is either a "high viscosity" Newtonian fluid, where the viscosity of the liquid is independent of flow parameters such as stress and strain, or a non-Newtonian, where the viscosity of the liquid is dependent on parameters such as stress or strain. The terms "high viscosity" or "highly viscous" as used here generally means a liquid that has a viscosity of more than 1 mPa-s. However, high viscosity could mean 0.01 mPa-s, 0.1 mPa-s, 10 mPa-s, 100 mPa-s, 1 Pa-s, 10 Pa-s, 100 Pa-s, 1000 Pa-s, or as low as 10,000 Pa-s. A non-Newtonian fluid means one that does not follow Newton's law of viscosity. Among other things, the viscosity of non-Newtonian fluids depends on flow rate and/or flow rate history, where the flow rate and flow rate history could be either in shear and extension, affected by either applied strain or applied stress. One particular example of a non-sprayable fluid of interest here involves increases in the viscosity with the application of deformation or kinematic strain, such as strain hardening upon elongation or fluid stretching.

Another property of interest involves changes in the viscosity with the application shear, such as shear thickening for increases in the viscosity, or shear thinning for decreases in the viscosity. Under some circumstances, shear thickening renders some fluids non-sprayable. Shear thinning, on the other hand, can help in fluid sprayability, except if the same fluid has other non-Newtonian behavior (such as strain hardening) that could render it non-sprayable. Not all high viscosity fluids are non-Newtonian fluids.

Until recently, converting high viscosity and non-Newtonian fluids to a spray has presented problems as they are generally too viscous to spray or they demonstrate higher viscosity as they elongate. An approached referred to as filament extension atomization (FEA) has successfully converted these fluids to sprays. An example of such a system is disclosed in several US Patents and published patent applications, including U.S. Pat. No. 9,789,499. High viscosity, non-Newtonian $CO_2$ capture solvents such as high specific absorption capacity, water-lean, or low heat capacity solvents can be sprayed using a core atomization technology suited for the high viscosity liquid capture solution, such as FEA.

Figure 3:
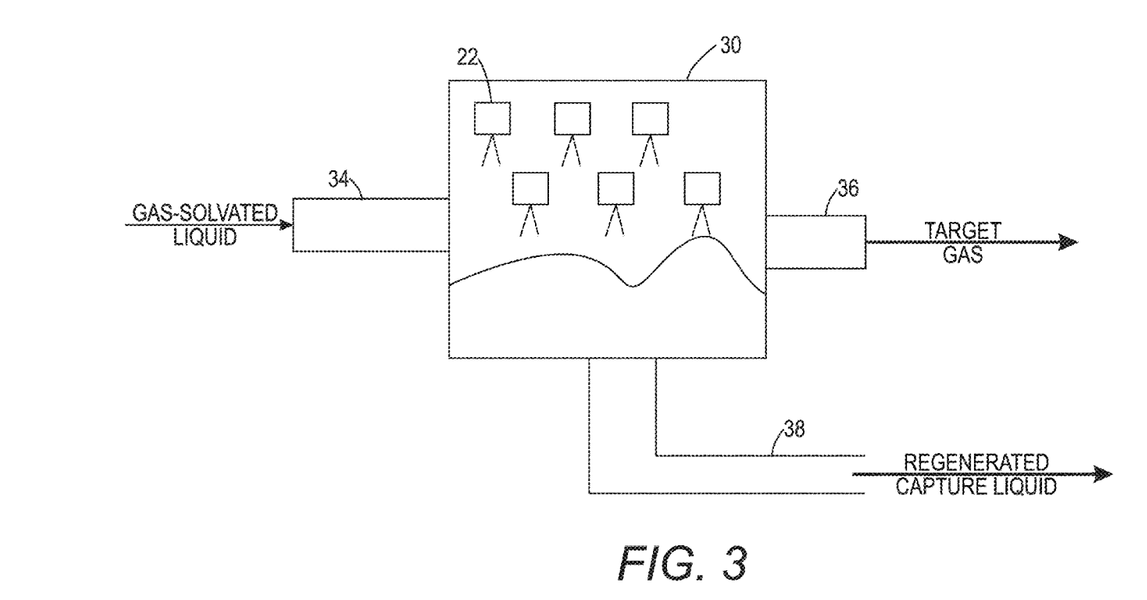
FIG. 3 shows an embodiment of a regeneration system for a carbon capture system using a spray contactor.

A conventional $CO_2$ capture process consists of two subprocesses, $CO_2$ adsorption and $CO_2$ stripping or desorption. The FEA process can be implemented in adsorption, stripping, or both. The capture solution may have a different viscosity in the absorption or stripping halves of the process due to differences in temperature, flow history and, or concentration of $CO_2$ or other target gas in solution. In the absorption process, FEA can be used to increase the kinetics of the adsorption process and/or to achieve higher $CO_2$ loadings and utilization of active absorber, by increasing the surface area-to-volume ratio of the liquid absorbent solution. A block level process diagram for the system is shown below in FIG. 1 which details the use of the spray contactor the absorption phase, FIG. 3 shows the regeneration phase.

Some of the embodiments use PARC's filament extension atomization (FEA) technology which is suited for high viscosity liquid sorbents, from 1 mPa-s up to 10,000 Pa-s, 7 orders of magnitude of viscosity. The sorbents can be selected for any number of parameters relevant to the capture process including high gas sorption capacity, cost, etc.

One should note that the embodiments here do not include additional process controls not depicted in the figures such as sensors and controls for pressure, flow rate, shear stress, normal stresses, temperature, and solvent or gas composition. The processes may include equipment for piping, heat integration, pre-conditioning, pre-heating, pre-shearing, or pre-cooling inputs and outputs, and, or equipment for condensing and re-boiling water or steam.

Figure 1:
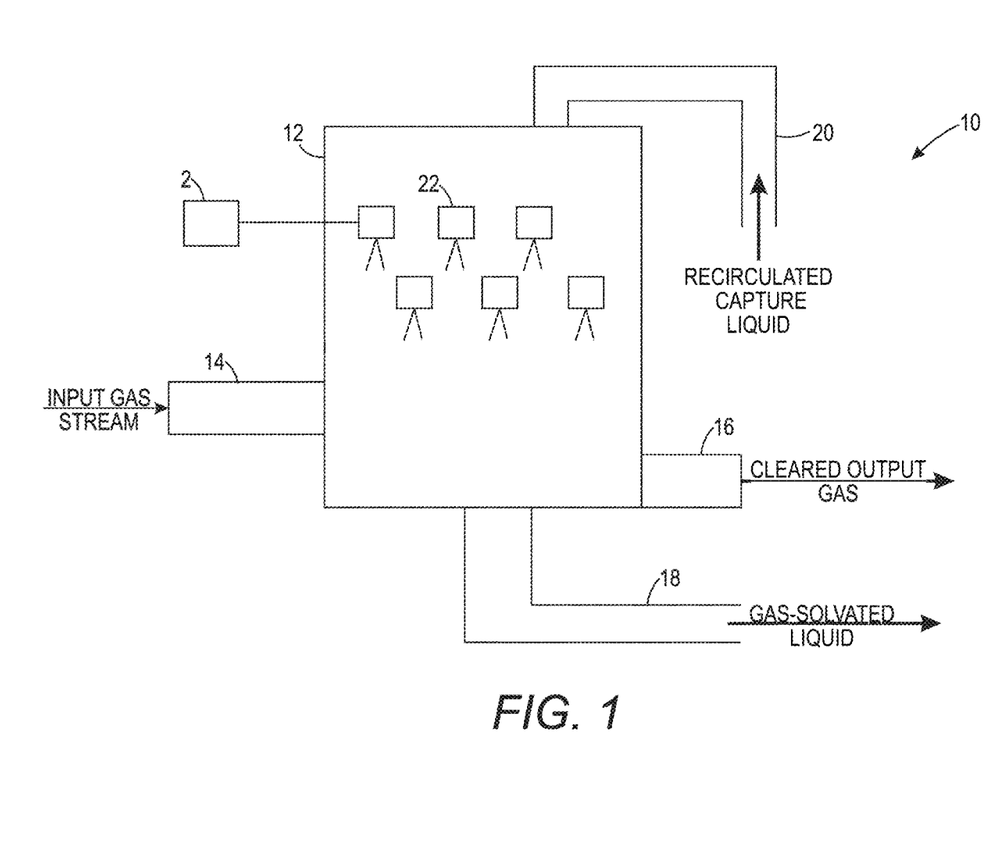
FIG. 1 shows an embodiment of a carbon capture system using a spray contactor.

The system 10 has a spray contactor 12. The spray contactor receives the input gas stream through an input port 14 that includes the gas targeted for separation, referred to here as the target gas. The spray generator heads such as 22 spray the gas as it passes through the contactor. The discussion here will refer to the array of spray generator heads as a "spray generator," with the understanding that the array may comprises an array of one head. The solution traps the target gas because the solvent is selected to react with the target gas. The spray generator heads such as 22 may also have a positive pressure source 2, such as a pump, to direct air to cause the spray from the heads towards the gas input port. The figures are not intended to imply relative spatial relationships between the components or inputs and outputs, nor are they intended to imply orientation with respect to gravity.

After the liquid from the spray generator traps the gas, it produces a gas-solvated liquid that exits the spray generator through output port 18. The gas in the gas-solvated liquid may be dissolved in the liquid physically or chemically, or it may be entrained as a mixture. This complex liquid may further be referred to as non-sprayable. The remaining gas of the input gas stream, referred to here as the cleared gas, exits the spray generator through output port 16. As will be discussed further with reference to FIG. 3, the gas-solvated liquid may undergo a stripping process to remove the captured gas, and the capture liquid from that process may recirculate through port 20 back to the adsorbing spray generators.

Before the discussion continues, one should note that the spray generator being an adsorbing spray contactor of FIG. 1 comprises only one possible configuration of a component that uses the array of spray generators for gas capture. The overall system, such as the one shown in FIG. 5, has as an inlet to receive a gas stream mixture that includes a target gas.

The gas stream mixture may comprise a gas, or a gas entrained in a liquid, which could also be referred to as gas-solvated liquid. The spray generator also has an outlet to output one or more an output materials. In the embodiment of FIG. 1, the output material may comprise a gas-solvated liquid. The gas solvated liquid output may be internal to the system, and recirculated via a recirculation path. In the embodiment of FIG. 3, where the spray generator comprises a spray regenerator, the input to the spray generator may comprise a gas entrained in the non-sprayable liquid resulting from any kind of sorption process whether it uses an adsorbing spray generator or not, and output material may comprise the target gas. The target gas output may be referred to as a system output. The output material comprising the target gas generally includes the target gas at a higher concentration than the input stream material. The regenerated capture liquid of FIG. 3 may be output or may remain within the system being circulated between the different spray generators.

Figure 5:
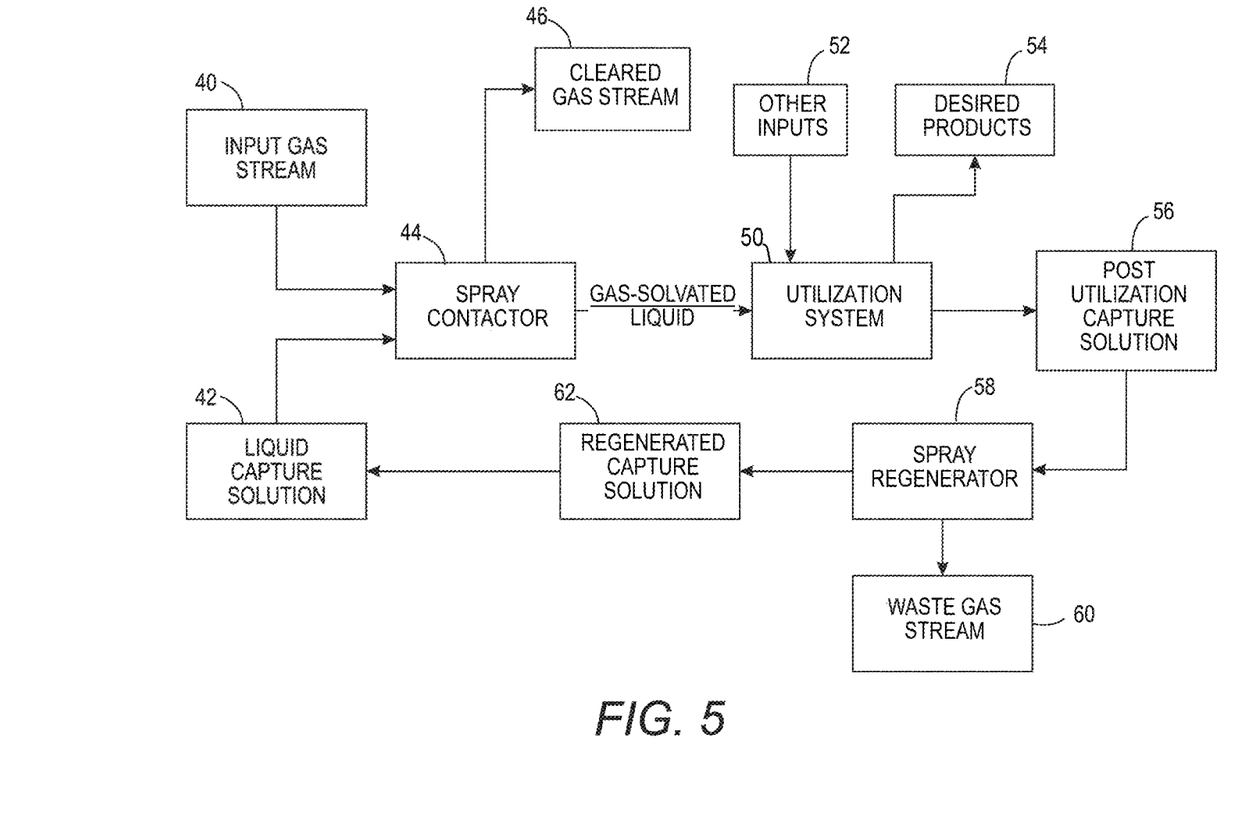

In FIG. 5, as a further example, a spray generator may be used in a utilization subsystem of the overall gas capture system, the inlet of a utilization spray generator may receive the gas-solvated non-sprayable liquid, also referred to as a gas-entrained liquid, and other inputs. While the different configurations of the various spray generators discussed above may have inlets positioned to receive the input materials above, they may also include inlets position to receive other materials. For example, in FIG. 5, the utilization system shows the other inputs 52, discussed in more detail below.

In the stripping, or regeneration, process, FEA can be used to increase kinetics of the desorption process or to achieve lower lean $CO_2$ loadings. FEA spray can also be used in a capture process that is coupled with $CO_2$ utilization, either in a combined desorption-utilization step, utilization instead of desorption, or utilization following desorption. If the capture solution has low viscosity and Newtonian behavior, other conventional spray methods such as pressurized nozzles or rotating disk atomizers can be used, which is known by those skilled in the art. However, these methods have limited applicability for high capacity capture solutions such as ionic liquids and even more limitations when these capture solutions are loaded with $CO_2$, which are sometimes more viscous than the capture solution itself.

In these embodiments a non-sprayable liquid means that the liquid is non sprayable (high viscosity, non-Newtonian, strain-hardening, etc.) at the point in the process at which it is being sprayed. In general, factors such as temperature and concentration of dissolved or entrained gas can modify the viscosity and rheological properties of the fluid. As the non-sprayable liquid is re-circulated it could be classed as sprayable at points in the cycle when it is not being atomized or sprayed and still be considered non-sprayable for the purposes of this discussion.

Figure 2:
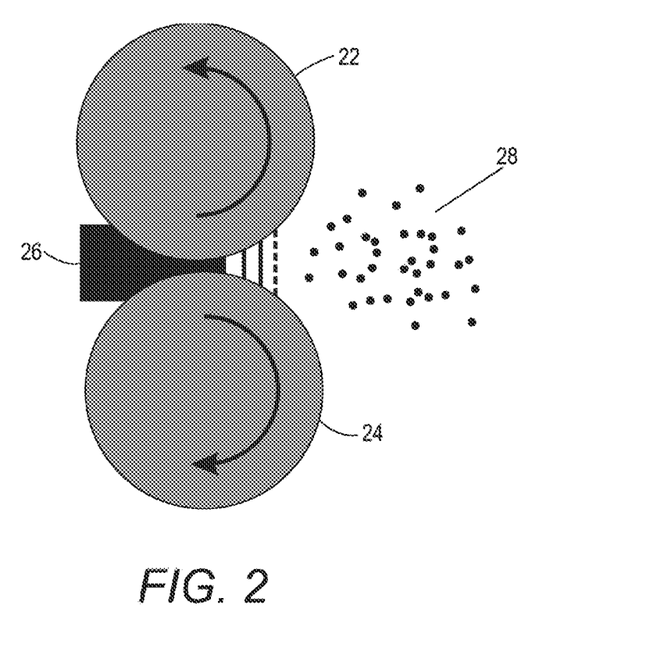
FIG. 2 shows an embodiment of a filament extension atomizer to generate sprays.

FIG. 2 shows an example of an FEA spray generator. The spray generator may comprise two counter-rotating rollers 22 and 24. One should note that while the figure only shows one pair of rollers, each spray generator may use one or more of many different configurations. For example, there may be multiple counter rotating rollers arranged in a row with each roller turning in alternating directions. The array of generators may have individual spray generators or an array of rollers. Alternatively, the spray generators may comprise a set of pistons, or a piston and a stable surface. The use of the counter rotating rollers has an advantage that the spinning of the rollers creates a little bit of directional air flow.

The non-sprayable liquid 26 enters a nip formed between the two surfaces of the rollers, between two pistons, or between a piston and a surface. As the surfaces diverge, such as when the surfaces of the rollers rotate away from each other, the non-sprayable fluid forms a set of filaments that elongate between the two surfaces. As the rollers rotate, the strain eventually causes the filaments to break up and form droplets 28 of the non-sprayable liquid. The FEA systems have the ability to break up and disperse high viscosity and non-Newtonians liquids as sprays, normally a difficult process that can require complex and expensive devices, which is why they are referred to here as non-sprayable.

In an alternative embodiment a high surface area is generated in the non-sprayable liquid by using the rollers or pistons to generate filaments that do not break up into droplets. Filaments re-combine with the bulk of the liquid after they are formed. Once the solvent is stripped of or loaded with the target gas, the solvent is subject to new conditions to either re-load with the target gas or regenerate.

The FEA $CO_2$ capture process involves the use of solvents that have viscosity higher than 1 mPa-s, water-like, and as high as 10,000 Pa-s, the viscosity of dense slurries such as sealants. Of particular interests are solvents or solvent mixtures which are strain hardening, showing a remarkable viscosity increase during elongation, and other non-Newtonian behavior, such as shear thinning, shear thickening, which may affect atomization. Such solvents could include aqueous amines with amine loading of greater than 20 wt % during absorption, which may include, but is not limited to: aqueous amines with amine loading greater than 10 wt %, 30 w %, 40 wt %, 50 wt %, 60 wt %, 70 wt %, 80 wt %, and 90 wt % during absorption; neat amines; solutions that include polymeric amines or oligomeric amines; amines with molecular weight of greater than 100 g/mol, amines with molecular weight greater than 200 g/mol, 400 g/mol, 600 g/mol, 800 g/mol, 1000 g/mol, and 5000 g/mol; and solutions that contain ionic liquids, phase change materials, or aminosilicones. Such fluids are advantageous due to their low specific heat capacities, such as below 110 J/mol/K. Alternatively, low specific heat capacity could be defined as below 200 J/mol/K, 180 J/mol/K, 160 J/mol/k, 140 J/mol/K, 120 J/mol/K, 100 J/mol/K, 80 J/mol/K, or 60 J/mol/K The FEA process may be used with lower viscosity liquids, but in the low viscosity regime, conventional spray processes may perform better. In some contexts, the absorption phase of the process may be referred to as adsorption.

It should be noted that some of these solvents show increase in viscosity when loaded or reacted with $CO_2$ or other molecular co-solvents, sometimes up to 10-1000 times of the pure solvent viscosity. The FEA $CO_2$ capture process can be used with $CO_2$ sources with $CO_2$ concentrations of greater than 10%, where conventional capture with MEA is not economical or energy efficient. The FEA $CO_2$ capture process can also be used for higher concentration $CO_2$ sources. While the FEA spray generator may work better than most spray generators for highly viscous and/or non-Newtonian fluids, no limitations to that particular type of spray generator is intended nor should any be any be implied.

The size distribution, and therefore the surface area, of the sprayed liquid droplets are tunable via the liquid solvent rheology, its surface tension as well as process parameters including the rotational speed of the rollers, inter-roller contact pressure and fluid feeding rate. To drive up the surface area resulting from the size of the droplets in the spray, one would increase roller speed and contact pressure while keeping dispense rate slow to maintain a low film thickness on the rollers, in some embodiments in the order of 100 microns. Droplets larger than 100 nm, 1 micron, 10 microns, 50 microns, 100 microns, 500 microns, 1 mm, 5 mm, and 10 mm are possible. Other process parameters that can be tuned include the surface free energy of the roller surface that can be used to manipulate liquid filament break-up as well as surface textures in the roller which can govern liquid filament diameters. To leading order, the emergent droplet diameters are related to the liquid filament diameters subject to filament thinning, as the filaments stretch, up to the point of break-up. Break-up is ultimately determined by the ratio of viscous forces, which increased from the zero shear value due to extensional hardening, with inertial forces, also affected by flow kinematics, and surface tension, unaffected by flow.

The table below shows the volume, droplet surface area, number of droplets per unit of volume and the total surface area for sprays with different average particle dimensions. It is clear from the table here that creating smaller droplets increases the total surface area per unit volume of capture solution which creates a more favorable scenario for gas exchange and for the capture reaction to take place. However, there are limits to the particle diameters achievable when generating droplets of any capture solution. This is determined by physical properties of the fluid related to droplet break-up such as the viscosity (at point of break-up), surface tension and density, as well as attributes imparted on the fluid by the spray process such as fluid feature size (length scale), flow rate and velocity.

| Ave. Particle Diameter (microns) | Droplet Volume (picoliter) | Droplet Surface Area (microns) | No. of Droplets per Unit Volume (drops/L) | Total Surface Area per Unit Volume ($m^2/L$) |
|---|---|---|---|---|
| 1 | 0.0005 | 3.14 | 1.91E+15 | 6000 |
| 5 | 0.0654 | 78.54 | 1.53E+13 | 1200 |
| 10 | 0.5236 | 314.16 | 1.91E+12 | 600 |
| 50 | 65.45 | 7853.98 | 1.53E+10 | 120 |
| 100 | 523.60 | 31415.93 | 1.91E+09 | 60 |
| 500 | 65449.85 | 785398.16 | 1.53E+07 | 12 |

Figure 4:
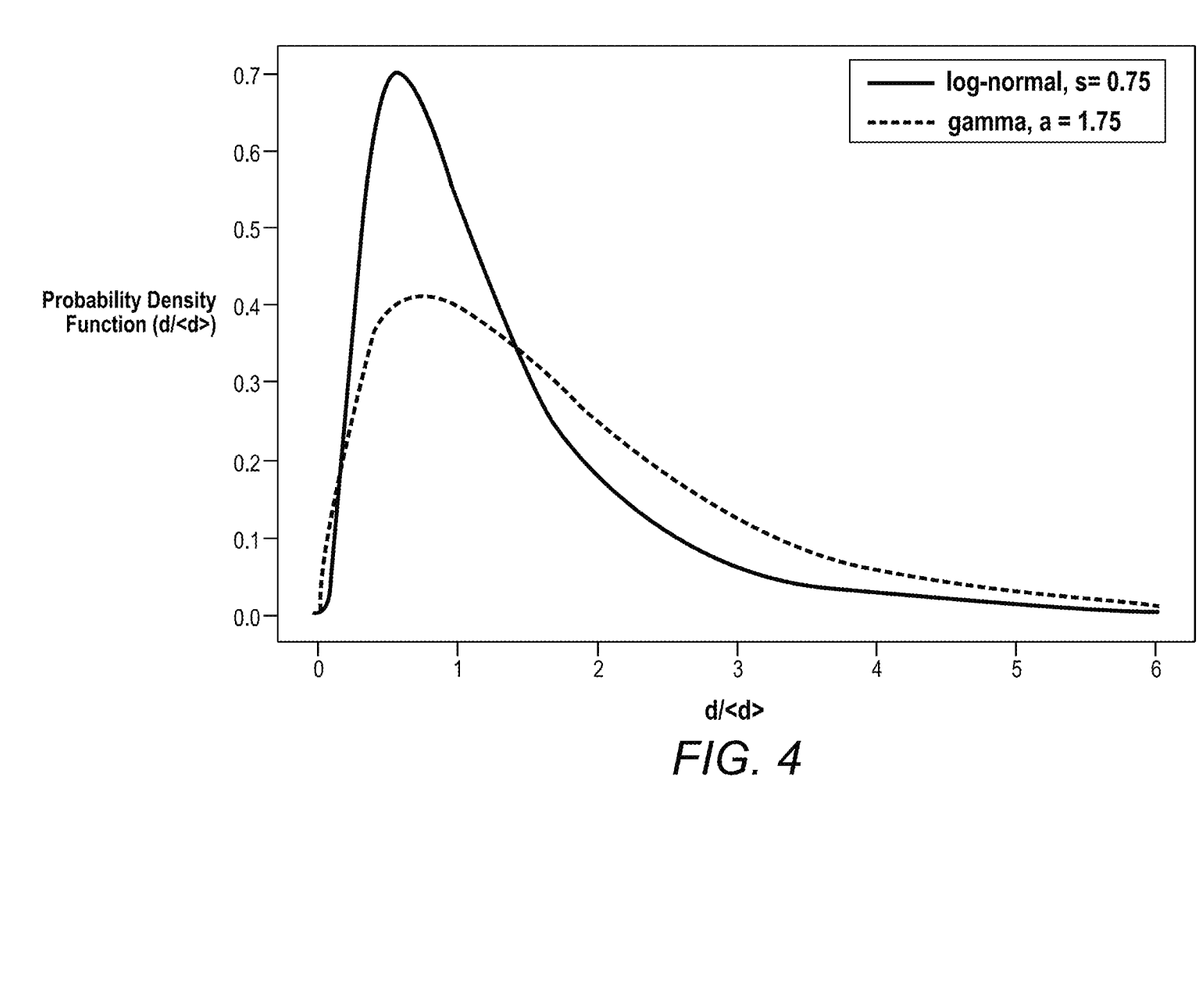
FIG. 4 shows a probability density function for droplets.

FIG. 4 shows a probability density function for the droplets. The two curves here show representative forms of two distributions of droplet diameters (normalized by the average droplet diameter <d>). For most Newtonian fluids, droplet size distributions generated from fluid break-up typically follow the log-normal distribution, of which an example is plotted in FIG. 4 (solid curve) centered on d/<d>=1. Different shapes of distributions follow based on this known mathematical distribution whose equation is $$DF\left(\frac{d}{<d>}, s\right) = \frac{1}{\frac{d}{<d>}s\sqrt{2\pi}} \exp\left(-\frac{\log^2 \frac{d}{<d>}}{2s^2}\right).$$

For most non-Newtonian fluids, particularly for fluids with sufficient strain hardening (which resists general fluid break-up), authors have found that the droplet diameters are better described by the Gamma distribution, an example of which is shown in FIG. 4 (dashed curve). The mathematical form of this distribution is given by the equation $$PDF\left(\frac{d}{<d>}, a\right) = \frac{\left(\frac{d}{<d>}\right)^{a-1}}{\Gamma(a)} \exp\left(-\frac{d}{<d>}\right).$$

The curve in FIG. 4 is still centered around d/<d>=1 but there is a higher fraction of droplets with diameters with d/<d>>1 as shown by the upper tail of the distribution.

It appears that the droplet size distributions followed by Newtonian and non-Newtonian capture solutions are different that to leading order, the impact of the spray process on total surface area per unit volume is still given by the average droplet diameter (Table). The regenerating spray contactor 30 of FIG. 3 receives gas-solvated liquid 34, from the adsorbing spray contactor of FIG. 1 or some other system. The spray contactor 30 having spray heads such as 22 receives a gas-solvated liquid. The gas-solvated liquid passes through the spray contactor and the solvent causes the target gas to be stripped out of the capture liquid. The spray contactor has an output port 36 for the target gas, and a regenerated capture liquid output 38. The regenerated capture liquid output 38 may connect to the liquid capture input 20 of FIG. 1.

FIG. 5 shows a diagram of an overall system, which may comprise different modules that can combine in different systems. For example, the spray contactor such as that of FIG. 1 may send the gas-solvated liquid to a utilization process without regeneration. In FIG. 5, the spray contactor 44 receives liquid capture solution 42 through a first port and the input gas stream 40 through a second port. The spray contactor 44 produces the cleared gas stream 46 through one output port, and the gas-solvated liquid through a second outlet port. As mentioned before, the gas-solvated liquid may go to a utilization process 50 and end there.

Alternatively, the utilization process 50 may involve adding other inputs 52 to the gas-solvated liquid to produce desired products 54. The resulting solution after the utilization process is referred to here as the post-utilization capture solution 56. This solution may then undergo further stripping or regeneration by a spray contactor 58 to provide a waste gas stream 60 and regenerated capture solution 62.

As mentioned above, FIG. 1 shows an adsorption spray contactor, FIG. 3 shows a regenerating or stripping spray contactor 30, and the utilization system may use spray contactors as well. The input to the spray contactor may be an input stream comprised of gas, liquid or a mix. The liquid output will be referred to as a remediated liquid, as it has been remediating in that the target material has been removed. The output may also comprise a gas. Systems may use the adsorption spray contactor with other types of regeneration systems, similarly, they may use the regenerating spray contactor with other types of adsorbers, or they may be used in conjunction with each other. The spray contactors may be used in the utilization system as well.

The $CO_2$ utilization process may involve creation of fuels, polymers, fertilizers, proteins, foams, mineral carbonates for use in food processing, man-made photosynthesis, and building blocks. Nitrogen utilization has even more applications, including fertilizers, feeds, industrial processes, etc. These processes may involve the addition of other materials such as 52 in FIG. 5. In a utilization process, the target gas is used in a downstream process such as mineralization, or reactions to form other chemicals or materials.

In an alternative spray contactor-based capture process, the gas-carrying liquid capture solution can be funneled directly into some utilization process without regeneration. Referring back to FIG. 1, the gas-solvated liquid would go directly to a utilization process like 50 in FIG. 5. In FIG. 5, the gas-solvated liquid in the utilization process 50 would end the process.

In an alternative spray contactor-based capture process, the gas-loaded liquid stream is funneled into a utilization process that produces a meaningful or desired product using other inputs. The resulting liquid by-product of said utilization process can be regenerated using another spray contactor. In general, the liquid by-product is non-sprayable at the point in the process when it is sprayed. The liquid byproduct can be referred to as a post-utilization capture solution, and it can be regenerated and recirculated to capture more target gas. In this scenario the waste gas stream can be sequestrated or just released. The utilization and spray regeneration steps may occurs as two separate processes or combined in a single spray step.

The high viscosity liquid could be encapsulated in a permeable membrane instead of sprayed already known in the art. However the permeable membrane presents a mass transport resistance that is not present in a spray. Other types of reactors can be and are used for $CO_2$ capture: bubble reactors, packed column reactors, falling film reactors, conventional spray towers. $CO_2$ separation can be achieved through many means other than the use of liquid solvents, such as membranes, physisorbing solvents, solid sorbents, and electrochemical processes. However, none of these methods have been proven economical to capture emissions at low $CO_2$ concentrations such as below 12%, 10%, 8%, 6%, 4%, 2%, 1% or 2000 ppm $CO_2$ or other target gas.

Conventional spray and other non-encapsulant approaches have limited tolerance to high viscosity and non-Newtonian liquids, and liquids with viscosity changes during the gas separation process.

As mentioned above, such liquids have advantages in low specific heat capacity, and high specific absorption capacity. They may also be advantaged by having added functionality as a catalyst or facilitator in a utilization process, such as ionic liquids. Such liquids may also have advantages in resisting degradation; for example compared to small molecule, highly mobile active solvents like monoethanolamine in water or piperazine in water, using capture liquids comprising polyamines would reduce the probability of side reactions, due to decreased mobility of polymers or oligomers. Polymer or oligomer-containing liquids are typically non-Newtonian and high viscosity, and require the novel spray processes described herein.

In summary, the overall system such as that show in FIG. 5, has one or more spray generators. The overall system has a system input inlet that is positioned to receive the input material. The input material including a target gas enters the system and an output of the system includes a material that has less of the target gas than the input material. The system also generally includes and output material with a higher concentration of target gas than the input material. The system includes one or more spray generators, either an adsorbing spray contactor, a regenerating spray contactor, or both. The system has a recirculating path that allows the non-sprayable liquid to circulate from the system outlet to the system inlet. In some instances the non-sprayable liquid will have the target gas entrained within it, in others it will just comprise the non-sprayable liquid.

The spray generator as adsorbing spray generator acts upon the input stream that includes a target gas. An example of such a configuration is shown in FIG. 1. The spray generator sprays the non-sprayable liquid as a capture solution and it interacts with the incoming mixture and changes the concentration of the target gas in the non-sprayable liquid by increasing it. The resulting products comprise a gas-solvated liquid that has more of target gas entrained in the liquid than the non-sprayable liquid had before interacting with the gas, and a cleared output gas that has less target gas than the input stream. The cleared output gas is considered a system output, and the gas-solvated liquid is considered an output or outlet of the spray contactor, internal to the system. The gas solvated liquid is fed to a regeneration or utilization process.

A spray generator acting as a spray regenerator receives a gas-solvated liquid, either from an adsorbing spray contactor or another source such as a conventional adsorbing contactor. An example of such a configuration is shown in FIG. 3. The gas-solvated liquid comprises the non-sprayable liquid having entrained target gas, either resulting from the non-sprayable liquid applied to the input stream mixture, or from a different adsorber that uses the non-sprayable liquid to capture the gas. The gas-solvated liquid constitutes an input to the spray regenerator. The spray regenerator sprays the non-sprayable liquid in a heated volume, and releases the gas from the liquid. Alternatively, heat may be directly applied to the liquid, for example during the spray process. The concentration of the target gas in the liquid changes by decreasing. The spray regenerator outlets are the system outlets for the target gas, wherein the target gas concentration is increased relative to the system input stream, and the collected non-sprayable liquid that can then recycle through the system. The outlet for the non-sprayable liquid is connected to the recirculating path.

Spray generators may also be used in a utilization process that sprays the gas-solvated liquid into a volume that also has other materials. The outlets from that type of spray generator are the non-sprayable liquid to be recirculated, which may be also referred to as post-utilization capture solution, and the utilization products.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the claims set out below.

What is claimed is:

1. A gas separation system comprising:
   a system input inlet configured to receive a stream mixture including a target gas;
   one or more spray generators positioned to spray a non-sprayable liquid to change a concentration of the target gas in the non-sprayable liquid;
   one or more system outlets positioned to outlet an output material, wherein at least one of the system outlets outputs a material having a lower amount of the target gas than the input stream mixture; and
   a recirculating path connected to the one or more system outlets and the input inlet to allow recirculation of the non-sprayable liquid.

2. The gas separation system as claimed in claim 1, wherein the one or more spray generators comprise at least one spray generator head, each head comprising:
   two opposed, counter-rotating rollers having a nip between the two rollers; and
   a fluid source to provide the non-sprayable capture liquid into the nip, the two counter-rotating rollers to stretch the non-sprayable capture liquid until the non-sprayable capture liquid breaks into droplets to form the spray.

3. The gas separation system as claimed in claim 1, wherein the non-sprayable liquid comprises a non-Newtonian fluid.

4. The gas separation system as claimed in claim 1, wherein the non-sprayable capture liquid is one or more selected from the group consisting of: aqueous amines with amine loading of greater than 20 wt %, polymeric amines, oligomeric amines, amines having a molecular weight of greater than 100 g/mol, solutions containing ionic liquids, phase change materials, $CO_2$-binding organic liquids with water concentration of less than 80 wt % at the temperature of $CO_2$ capture, liquids having a specific heat capacity of less than 110 J/mol/K, and aminosilicones.

5. The gas separation system as claimed in claim 1, wherein the one or more spray generators comprises one or more regenerating spray contactors, wherein an inlet to the one or more regenerating spray contactors is positioned to receive a gas-solvated liquid of the non-sprayable liquid and the target gas, the one or more regenerating spray contactors to apply the gas-solvated liquid as a spray to release the target gas from the non-sprayable liquid to at least two regenerator spray contactor outlets to output the gas and the non-sprayable liquid.

6. The gas separation system as claimed in claim 5, further comprising a heat source positioned to apply heat to the gas-solvated liquid to release the target gas from the gas-solvated liquid.

7. The gas capture system as claimed in claim 5, wherein an outlet of the regenerating spray contactor comprises one of the one or more system outlets for gas released from the gas-solvated liquid, and a liquid outlet connected to the recirculation path to recirculate the non-sprayable liquid from which the target gas has been released.

8. The gas separation system as claimed in claim 1, further comprising a carbon utilization system within the gas separation system, the utilization system having one or more of the spray generators positioned to apply a gas-solvated liquid to other input materials, the utilization system further having one or more utilization outlets, wherein the one or more utilization outlets comprises at least a liquid outlet connected to the recirculation path to recirculate a post utilization non-sprayable liquid and an outlet for desired utilization products derived from the target gas.

9. The gas separation system as claimed in claim 1, wherein an inlet to the one or more of the spray generators comprises the system input inlet positioned to receive the input stream mixture, and the one or more of the spray generators is positioned to apply the non-sprayable liquid to the input stream mixture, the spray generator having one or more spray contactor outlets to output a gas-solvated liquid and an output gas stream having less of the target gas than the input stream mixture, the spray contactor outlets comprises one of either system outlets or outlets internal to the system.

10. The gas separation system as claimed in claim 1, wherein the non-sprayable liquid capture has a viscosity in a range of 1 mPa-s to 10,000 Pa-s.

11. The gas separation system as claimed in claim 1, wherein the non-sprayable liquid comprises a high-viscosity liquid having non-Newtonian strain hardening behavior in extension.

12. The gas separation system as claimed in claim 1, wherein the one or more spray generators are configured to spray the non-sprayable liquid as droplets with an average size of 1 to 500 microns and where the total surface area generated per unit volume of capture solution ranges from 12 to 6000 $m^2$/L.

13. The gas separation system as claimed in claim 1, wherein the gas separation system is positioned to receive the input stream mixture including either nitrogen or carbon dioxide.

\* \* \* \* \*